United States Patent

Fukabori et al.

[11] Patent Number: 5,849,062
[45] Date of Patent: Dec. 15, 1998

[54] METHOD FOR RECOVERING METALLIC MATERIALS OF GAS GENERATOR FOR AIR BAG

[75] Inventors: Mitsuhiko Fukabori, Hyogo; Yuzaburo Nakazato, Gunma; Osamu Fujimoto; Yutaka Kondoh, both of Aichi; Masahiro Miyaji, Aichi, all of Japan

[73] Assignees: Daicel Chemical Industries, Ltd., Osaka; Toyota Jidosha Kabushiki Kaisha, Aichi, both of Japan

[21] Appl. No.: 836,409

[22] PCT Filed: Nov. 6, 1995

[86] PCT No.: PCT/JP95/02251

§ 371 Date: May 2, 1997

§ 102(e) Date: May 2, 1997

[87] PCT Pub. No.: WO96/14173

PCT Pub. Date: May 17, 1996

[30] Foreign Application Priority Data

Nov. 4, 1994 [JP] Japan .................................. 6-270868

[51] Int. Cl.[6] ................................ C22B 7/00; C22B 9/20
[52] U.S. Cl. ....................... 75/10.65; 75/10.66; 75/401; 75/581; 75/687
[58] Field of Search ......................... 75/687, 581, 10.65, 75/10.66, 401

[56] References Cited

U.S. PATENT DOCUMENTS 5,294,244  3/1994  Allerton, III et al. .
5,578,110  11/1996  Nakasato et al. ........................ 75/403

FOREIGN PATENT DOCUMENTS 60-172358  9/1985  Japan .
5-171305  7/1993  Japan .
6-91197  4/1994  Japan .
7-277131  10/1995  Japan .

*Primary Examiner*—Melvyn Andrews
*Attorney, Agent, or Firm*—Birch, Stewart, Kolasch & Birch, LLP

[57] ABSTRACT

To provide a method for taking out gas generators readily from waste vehicles and then recovering metallic materials of gas generators taken out efficiently. The method is comprised by a) crushing waste vehicles in which air bag apparatuses are installed by a crushing means so that the crushed pieces have approximately the same size as that of the gas generators themselves and the gas generators themselves can be separated from the air bag apparatuses as single bodies without being substantially crushed; b) taking the gas generators out of the crushed pieces of the waste vehicles; c) charging the gas generators thus taken out into a melting furnace; and d) recovering the metallic materials of the gas generator from the melting furnace.

6 Claims, 2 Drawing Sheets

METHOD FOR RECOVERING METALLIC MATERIALS OF GAS GENERATOR FOR AIR BAG

FIELD OF THE INVENTION

The present invention relates to a method for disposing of a gas generator for an air bag which is used for protecting a passenger from impact, specifically to a method for taking out a gas generator from a waste vehicle and recovering metallic materials from the gas generator.

DESCRIPTION OF PRIOR ART

An air bag apparatus(es) is installed in a vehicle for the purpose of protecting passengers from impact caused by collision. This air bag apparatus comprises an air bag to be expanded by gas at collision to form a cushion between a passenger and a steering wheel or seat, and a gas generator to feed gas into the air bag.

A gas generator is comprised of a housing made of a metallic material, a gas generating agent disposed in this housing and an ignition means for igniting this gas generating agent. The ignition means is actuated by impact, and this causes the gas generating agent to burn to generate high temperature and high pressure gas.

A member for forming the housing of the gas generator is made of, for example, aluminum or stainless steel. The gas generating agent includes, for example, $NaN_3$ (sodium azide), $CuO$ (copper monoxide) and the like as a principal component. In addition to the above, parts such as a filter comprising a stainless metal mesh, stainless wool and ceramic, etc., and a coolant are contained in the gas generator.

In order to take out a gas generator from an air bag apparatus installed in a waste vehicle, the following manual procedure is used: detaching an air bag apparatus from a steering wheel; disassembling the detached air bag apparatus in order, beginning with an air bag cover, an air bag, a gas generator and a steering wheel adaptor; and then, recovering the gas generator.

A method disclosed in, for example, U.S. Pat. No. 5,294,244 is available as a method for recovering metallic materials from a gas generator. In this method, metallic materials are recovered separately by making use of a difference in the melting points of the metallic materials. According to this method, a gas generator containing aluminum alloy parts and non-aluminum alloy parts are heated in the range of the melting point of aluminum to recover aluminum alloy, and then the remaining non-aluminum alloy parts are heated up to a higher temperature than the melting point of stainless steel alloy to recover stainless steel alloy.

As a method for recovering metallic materials from a gas generator, the gas generator is crushed or pulverized, and the metallic materials of the gas generator are classified from the pulverized solid particles by magnetic separation or gravity separation etc. to melt the separated materials into ingots.

In the preceding conventional method for recovering a gas generator by manual operation, there are problems that the recovering efficiency is very low and the recovering cost becomes expensive as well because of the fact that first of all, a waste vehicle in which an air bag apparatus(es) is installed has to be found out among waste vehicles not having an air bag apparatus(es), and that labor and time are required as described above in order to recover the gas generator from the waste vehicle found.

It is expected that the number of air bag apparatus-mounted vehicles will increase in the future. Therefore, a method for recovering a gas generator from a waste vehicle at a high efficiency and low cost is desired.

U.S. Pat. No. 5,294,244 does not refer to a method for recovering a gas generator from a waste vehicle.

In a conventional method in which a gas generator is crushed or pulverized in order to recover metallic materials from the gas generator, the housing is not easily crushed or pulverized because the housing of the gas generator is firmly constituted and has a high rigidity. That has produced the problems that a specific blade and a large power are required.

SUMMARY OF THE INVENTION

Accordingly, an object of the present invention is to solve the preceding problems in conventional techniques.

The present invention relates to a method for recovering metallic materials, that is, a method for recovering metallic materials of gas generators for air bags from waste vehicles comprising:

a) crushing waste vehicles in which air bag apparatuses are installed by a crushing means adjusted so that the crushed pieces have approximately the same size as that of the gas generators themselves, and the gas generators themselves without being substantially crushed can be separated in the form of a single body from the air bag apparatuses, b) taking the gas generators out of the crushed pieces of the waste vehicles, c) charging the gas generators thus taken out into a melting furnace, and d) recovering the metallic materials of the gas generators from the melting furnace.

In other words, the method of the present invention is a method for recovering metallic materials of gas generators for air bags from waste vehicles, comprising a) crushing waste vehicles in which air bag apparatus are installed by a crushing means so that the crushed pieces have approximately the same size as that of the gas generators themselves, and the gas generators themselves can be separated from the air bag apparatuses as single bodies without being substantially crushed; b) taking the gas generators out of the crushed pieces of the waste vehicles; c) charging the gas generators thus taken out into a melting furnace; and d) recovering the metallic materials from the melting furnace. That is, the method of the present invention comprises crushing waste vehicles so that the crushed pieces have approximately the same size as that of the gas generators themselves and the gas generators themselves are not substantially crushed. And the gas generators are taken out thereof and melted in a melting furnace to recover the metallic materials of the gas generators.

The crushing means is preferably a crusher in which vehicles are crushed by rotation of blades.

The gas generators can be taken out by classifying them into ones having housing made of aluminum and ones having housing made of stainless steel.

Further, the gas generators classified into ones having housing made of aluminum and ones having housing made of stainless steel are preferably charged into respective melting furnaces.

The gas generators may be actuated as well before charging them into a furnace.

In addition, the gas generators may be actuated by heating.

The present inventors have crushed a waste vehicle in which an air bag apparatus is not installed, and which has been compressed by soft pressing, using a crusher (shredder manufactured by Tissenhenschel Co., Ltd., Germany) which is used in disposing of waste vehicles with shredder rotary blades, manufactured by the same company. And the present inventors have observed that an average size of crushed pieces discharged from the crusher on a belt conveyor is approximately the same as that of a gas generator. It has been expected, therefore, that in crushing waste vehicles in which air bag apparatuses are installed, the gas generators themselves will not be crushed and will be able to be separated from the other parts of the air bag apparatus due to the firmness of the gas generators, since an average size of the crushed pieces is approximately the same as that of the gas generators.

In the case where the crushed pieces of waste vehicles are markedly smaller than the gas generators, the gas generators are finely broken by crushing, and it is difficult to distinguish the finely broken gas generators and take them out of the crushed pieces of the crashed vehicles.

On the other hand, in the case where the crushed pieces of waste vehicles are notably larger than the gas generators, the gas generators remain as part of the air bag apparatus and are mounted thereon, and therefore this part would have to be detached from the gas generators themselves by manual work.

A waste vehicle with an air bag apparatus(es) compressed by soft press has been charged into the above mentioned crusher and was crushed. It has been found, as expected, that the gas generator has been separated in the form of a single body from the air bag apparatus in the crushed pieces discharged from the crusher. It has been confirmed by the present inventors that a gas generator can independently be taken out of a waste vehicle by crushing it with a crusher which is controlled so as to crush the waste vehicle into pieces having such size as described above.

Further, it has been found that a gas generator having a housing made of aluminum can readily be distinguished from a gas generator having a housing made of stainless steel and both can be taken out separately.

If gas generators themselves have been finely broken, a chance to take out the gas generators already having a relatively high grade has been lost. That is, the crushed pieces have to be sent to a certain conventional metal classifying after the step of finely breaking, and passed through such extra steps as magnetic separation, gravity separation etc.

When taking gas generators out of waste vehicles, they are taken out preferably classifying into the gas generators having housing made of aluminum and the gas generators having housing made of stainless steel. This saves labor for classification when charging them into the following exclusive melting furnaces, that is, a melting furnace for aluminum and a melting furnace for stainless steel and therefore makes it possible to carry out the operation efficiently.

Respective ingots can be separately obtained by charging gas generators into melting furnaces classified into the gas generators having housing made of aluminum and the gas generators having housing made of stainless steel and causing molten aluminum metal and molten stainless steel metal to flow into respective ingot molds.

The gas generators having housing made of aluminum and the gas generators having housing made of stainless steel can be charged as well into a melting furnace together. In this case, an aluminum ingot and a stainless steel ingot can finally be obtained by making use of a difference between the melting points thereof.

When charging non-actuated gas generators into a melting furnace, there is a risk that the gas generators are actuated in the furnace in a certain case, so that molten metal is scattered, and therefore a closed type melting furnace is preferably used. In the case of gas generators which have already been actuated, the furnace to be used does not have to be restricted to closed type melting furnaces, and open type melting furnaces can be used as well.

Before non-actuated gas generators are charged into a melting furnace, they can be actuated. In this case, the gas generators can be actuated by heating. For example, a non-actuated gas generators are heated to 150° to 450° C. to ignite and completely burn the gas generating agent, whereby a safety treatment can be carried out, and the treated gas generators can be sent to the next step. A heating furnace can be applied as a heating facility, and a batch system or a continuous processing system are available as a heating system. In the heating furnace of the batch system, plural nonactuated gas generators are actuated at the same time to generate a large amount of gas at once, and therefore a safety countermeasure has to be considered.

On the other hand, in the heating furnace of the continuous processing system, gas generators can be actuated in succession by sending the gas generators into the furnace by using a transporting means such as a conveyor, and therefore such heating furnace is preferred in terms of safety. Further, heating time and heating temperatures for the gas generators can be controlled by regulating a feeding rate of the gas generators.

There is a fear of that gas blows out by the actuation of a gas generator and the gas generator flies and rushes by with an impellent force. Accordingly, a gas generator is preferably fixed by means of a fixing means. For example, a metal mesh for receiving a gas generator and supporting bars for holding a gas generator can be used as the fixing means.

It is considered that pressure in a furnace is suddenly changed while the gas is generated. In order to cope with this, it is preferred that a buffer space is provided to the inner of the furnace. In order to heat non-actuated gas generators, exhaust heat or remaining heat of a melting furnace into which gas generators are charged can be utilized as well.

The following methods can be used in order to actuate gas generators.

1. In the case of an electric type gas generator, it can be actuated by connecting wire of an ignition device of the gas generator to a battery and applying a prescribed current.

2. In the case of a mechanical type gas generator, it can be actuated by falling into a used tire(s).

The present invention is constituted as explained above, and therefore a gas generator(s) can be readily taken out of a waste vehicle. The present invention can remove work for detaching gas generators from waste vehicles by manual work which is troublesome and takes much time, and makes it possible to recover a lot of gas generators at a good efficiency and low cost. Further, according to the present invention, it is possible to take out gas generators in the form of a single body so that it is easier to classify the gas generators by the difference in metallic materials. As a result thereof, gas generators can be put into melting furnaces by the difference in metallic materials to recover metals by the difference in metallic materials effectively.

EXAMPLES

Figure 1:
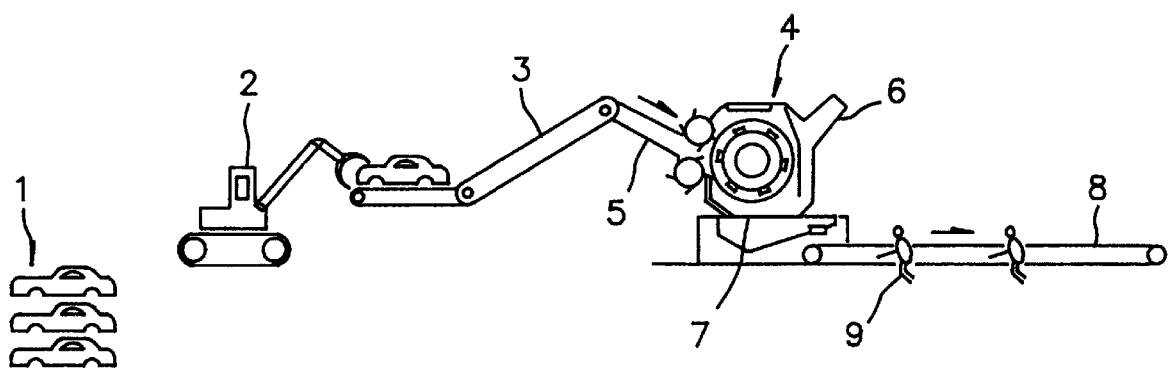
FIG. 1 is a structural drawing showing a crushing means suitable for effectuating the method of the present invention and an apparatus connected thereto.

The present invention will now be described below with reference to examples. FIG. 1 is a structural drawing showing a crushing means suitable for effectuating the method of the present invention and an apparatus connected thereto. Scrapped vehicles 1 from which useful parts such as batteries and tires are detached are piled up. The vehicles in which air bag apparatuses are not installed may be contained in these waste vehicles. These waste vehicles can be pressed in advance. The waste vehicles 1 are put on a feed conveyor 3 by means of a loader 2 and sent to a crushing means, that is, a shredder 4. The waste vehicles 1 are charged into the body of the shredder from a charging port 5 of the shredder and crushed therein. Light matters such as plastics out of the crushed pieces are blown up from an exhaust port 6 at the upper side of the shredder and sent to, for example, a cyclone which is not illustrated and the light matters are recovered as dusts therein. Heavy matters are discharged from a discharging port 7 at the lower side and carried to the outside on a belt conveyor 8. Gas generators of single bodies separated from air bag apparatus, which have been detached from the waste vehicles by shredder 4, are contained in the crushed pieces on the belt conveyor 8. Workers 9 recover the gas generators of single bodies along the belt conveyor 8.

Example 1

Waste vehicles having air bag apparatuses mounted therein, which had been pressed in advance, were charged into a shredder (2000 HP) manufactured by Tissenhenschel Co., Ltd. (Germany) by means of a feed conveyor at a rate of 2 vehicles per minute. The pieces of the crushed waste vehicles were classified into light pieces and heavy pieces by an air current given by blowing air into the shredder. Among these pieces, the heavy pieces were discharged from the lower portion of the shredder. The weight of discharged heavy pieces accounted for about 90% of the weight of the charged waste vehicles. Gas generators installed in air bag apparatuses mounted in the waste vehicles were contained in the form of a single body in the discharged heavy pieces.

Before charging the gas generators taken out into a melting furnace, the non-actuated gas generators can be actuated in advance by methods such as heating.

Example 2

Ten non-actuated electric type gas generators were fixed at spaces of 150 mm by metal meshes at upper and lower parts thereof. Then, the fixed gas generators were charged into an electric furnace maintained at 250° C. at a moving rate of 150 mm/minute. The first gas generation took place in about 5 minutes after starting charging, and the gas generation was repeated at an interval of about one minute. The last gas generator was discharged from the electric furnace about 20 minutes later, and all gas generators were cooled down in the air outside the furnace for about one hour. All gas generators had been actuated.

Figure 2:
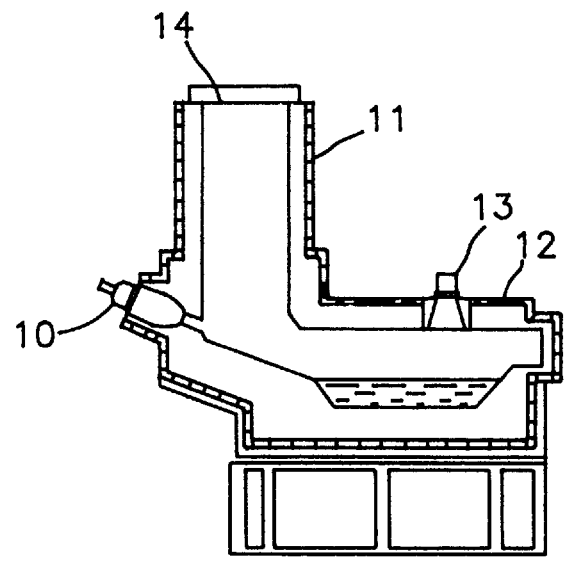
FIG. 2 is a cross sectional drawing showing a rapid melting furnace for use in effectuating the method of the present invention.

Various melting furnaces can be used for a melting furnace into which the gas generators taken out are charged. FIG. 2 shows a rapid melting furnace. This furnace is a continuous melting furnace comprising a tower type melting furnace 11 having a high speed burner 10 (blowing speed: 100 to 300 m/sec) built therein and a sealed type temperature rising and retaining furnace 12 combined therewith. The inside of the tower type melting furnace 11 is sufficiently heated by exhaust heat of the high speed burner 10 and a temperature rising burner 13, and therefore metal charged from a charging port 14 will be rapidly molten.

Example 3

Gas generators were charged into the rapid melting furnace described above. Ten non-actuated gas generators having housings made of aluminum were charged from the charging port 14 mixing with 500 kg of a used aluminum material. The gas generators and the used aluminum material were heated in the tower type melting furnace 11 which has been sufficiently heated, and sound caused by the gas generators actuated about 30 seconds later since charging was recognized, and sounds caused by the gas generators actuated in succession were recognized up to 90 seconds since then. The furnace was not damaged by the actuations of the gas generators. Aluminum was molten out of the gas generators and recovered in the form of ingot. Metals (for example, stainless steel metal mesh constituting a coolant) other than aluminum were not molten and recovered separately from molten aluminum.

Figure 3:
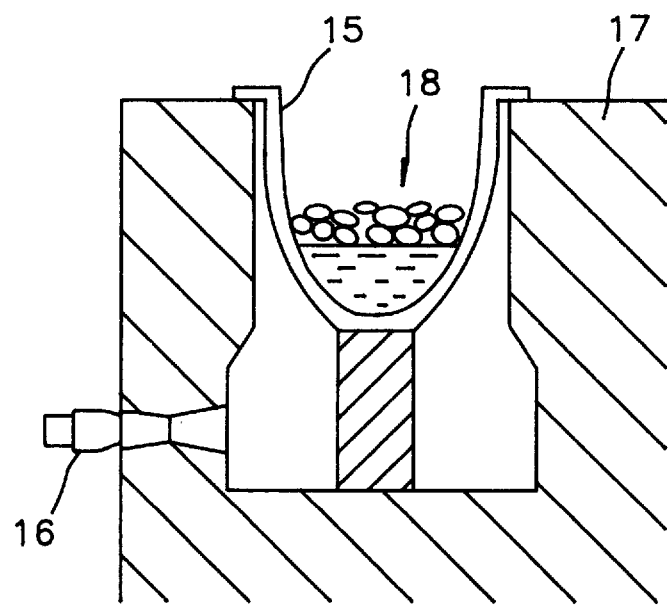

FIG. 3 shows another example of a melting furnace into which the gas generators are charged. This furnace is an open type crucible furnace having a structure in which a burner 16 is operated at the outside of a crucible 15 to heat molten metal in the inside thereof. A graphite crucible or an iron-made crucible having a good heat conductivity is used as the crucible, and a high anti-heat insulating refractory 17 is used in the circumference of the crucible.

Example 4

One hundred actuated gas generators having housings made of aluminum were charged into an iron made-crucible furnace (inner diameter: 760 mm, thickness: 35 mm and depth: 800 mm) having a capacity of 600 kg manufactured by Okuyama Heavy Oil Furnace Co., Ltd. Aluminum was molten out of the gas generators and accumulated at the bottom of the furnace. Metals (mainly stainless steel) other than aluminum remained in unmolten state at the upper side of molten metal. An unmolten metallic material 18 was taken out by a dipper having holes, and the remaining molten aluminum was scooped out by another dipper and poured into an iron-made ingot mold. Then, it was cooled down and recovered as aluminum metal.

Figure 4:
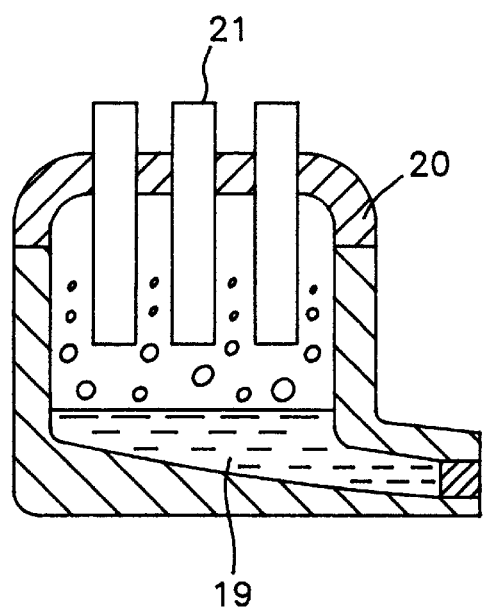
FIG. 3 and FIG. 4 are a cross sectional drawing of an open type crucible furnace for use in effectuating the method of the present invention and a cross sectional drawing of an arc furnace to use in the invention. In the drawings, 1: waste vehicle, 2: loader, 3: feed conveyor, 4: shredder, 8: belt conveyor, and 9: worker.

FIG. 4 shows still another example of a melting furnace into which the gas generators are charged. This furnace is an arc type furnace which is one kind of an electric type furnaces, and the constitution thereof comprises a hearth 19 for storing molten metal and a lid 20 for thermal insulation/heat holding and supporting electrodes. The electrodes 21 are movable upward and downward.

Example 5

Fifty non-actuated gas generators each having housing made of stainless steel were mixed with a used stainless steel material of 2500 kg and charged into an arc type furnace having a capacity of 50 tons. The charged gas generators and the used stainless steel material were heated to high temperatures at the upper part of the furnace, and the actuation of the gas generators as well as burning of oil and fat component(s) adhered on the used stainless steel material was confirmed. The gas generators were molten together with the used stainless steel material and taken out of the hearth in the form of molten metal.

What is claimed is:

1. A method for recovering metallic materials of gas generators for air bags from waste vehicles comprising:
   a) crushing waste vehicles in which air bag apparatuses are installed by a crushing means adjusted so that crushed pieces have approximately the same size as that of said gas generators, wherein the gas generators that are not substantially crushed can be separated from the air bag apparatuses,
   b) taking the gas generators out of the crushed pieces of the waste vehicles,
   c) charging the gas generators thus taken out into a melting furnace, and
   d) recovering the metallic materials of the gas generator from the melting furnace.

2. The method as claimed in claim 1, in which the crushing means is a crusher which crushes the waste vehicles by rotating blades.

3. The method as claimed in claim 1, wherein some of said gas generators have housings made of aluminum and some of said gas generators have housings made of stainless steel and wherein said method further comprises the steps of taking out the gas generators by classifying gas generators having housings made of aluminum from gas generators having housings made of stainless steel, separating said gas generators having housings made of aluminum from said gas generators having housings made of stainless steel and charging the gas generators having said aluminum housings into a melting furnace(s) separately from gas generators having stainless steel housings.

4. The method as claimed in claim 1, which comprises a step of actuating the gas generators before charging into the melting furnace.

5. The method as claimed in claim 4, in which the gas generators are actuated by heating.

6. The method according to claim 1, wherein said melting furnace is a tower melting furnace, an open type crucible furnace, or an arc furnace.

* * * * *